US009641811B2

(12) United States Patent
Jose et al.

(10) Patent No.: US 9,641,811 B2
(45) Date of Patent: May 2, 2017

(54) SYSTEM AND METHOD FOR PROVIDING REAL-TIME MAINTENANCE, TROUBLE-SHOOTING, AND PROCESS ASSURANCE FOR THE OILFIELD

(71) Applicants: Sunil J. Jose, Houston, TX (US); Daniel J. Daulton, The Woodlands, TX (US)

(72) Inventors: Sunil J. Jose, Houston, TX (US); Daniel J. Daulton, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 402 days.

(21) Appl. No.: 14/305,299

(22) Filed: Jun. 16, 2014

(65) Prior Publication Data

US 2015/0365635 A1 Dec. 17, 2015

(51) Int. Cl.
*H04N 7/14* (2006.01)
*H04N 7/18* (2006.01)
(Continued)

(52) U.S. Cl.
CPC ............ *H04N 7/185* (2013.01); *E21B 41/00* (2013.01); *H04N 7/18* (2013.01); *H04N 7/147* (2013.01); *H04N 7/15* (2013.01)

(58) Field of Classification Search
CPC ..................................................... H04N 7/14
(Continued)

(56) References Cited

U.S. PATENT DOCUMENTS 7,496,353 B2 * 2/2009 Odinak ............... H04L 12/1822
455/413
7,844,699 B1 11/2010 Horrocks et al.
(Continued)

FOREIGN PATENT DOCUMENTS

KR 100789474 B1 1/2008
KR 20130092061 A 8/2013

OTHER PUBLICATIONS

Baker Hughes, "Beacon Condor, Preliminary Technical Requirements for BP GOM Field Test on DS3rig";(2013). 7 pages.
(Continued)

*Primary Examiner* — Olisa Anwah
(74) *Attorney, Agent, or Firm* — Cantor Colburn LLP

(57) ABSTRACT

An operation, communication, and executions facilitation system includes at least one modular system device including at least one onsite fixed-base camera configurable at an onsite location directed at job equipment for remote live operation viewing by at least one offsite actor. At least one onsite hand-held camera directable by at least one onsite actor at selected equipment for remote live viewing of custom images by the at least one offsite actor. At least one audio communication device usable by the at least one onsite actor, and at least one personal computer configurable to receive data from onsite equipment. A secured or dedicated network connected to one or more of the at least one modular system device. A data center in communication with the secured or dedicated network; and, at least one operations center at an offsite location configured to be manned by the at least one offsite actor and configured to receive data via the data center from the at least one modular system device. Wherein two-way communication between the at least one offsite actor and the at least one onsite actor is accomplished through one or more of the at least one onsite hand-held camera, the at least one audio communi-
(Continued)

cation device, and the at least one personal computer. A method of providing and facilitating real-time equipment maintenance, trouble-shooting, and targeted remote operational process assurance of an operation.

23 Claims, 10 Drawing Sheets

(51) Int. Cl.
*E21B 41/00* (2006.01)
*H04N 7/15* (2006.01)
(58) Field of Classification Search
USPC .................. 348/14.01, 14.02, 14.03, 14.05
See application file for complete search history.

(56) References Cited

U.S. PATENT DOCUMENTS

| | | | |
|---|---|---|---|
| 2004/0075566 A1 | 4/2004 | Stepanik et al. | |
| 2006/0179463 A1* | 8/2006 | Chisholm | G08B 13/19656 725/90 |
| 2012/0143899 A1 | 6/2012 | Arango et al. | |
| 2012/0158337 A1 | 6/2012 | Singh et al. | |
| 2012/0204142 A1* | 8/2012 | Rubenstein | G06F 9/44526 717/101 |
| 2014/0195295 A1* | 7/2014 | Whitley | G06Q 10/0633 705/7.27 |
| 2015/0009215 A1* | 1/2015 | Vallikkat Thachaparambil | G06T 19/20 345/420 |
| 2015/0244977 A1* | 8/2015 | Sherburne | H04N 7/142 348/14.02 |
| 2016/0201446 A1* | 7/2016 | Anghelescu | E21B 44/00 702/9 |

OTHER PUBLICATIONS

Halliburton and BP Norway Break Barrier in Real Time Operations; Companies Work Onshore to Complete First Offshore Cement Job Using Only Remote Control; May 20014; retrieved frm the internet; —http://www.businesswire.com; 2 pages.

Jose, et al.; "Trusted Operations—Integrating Operational Performance, Safety and Security Assurance"; SPE 167905; (2014): 10 Pages.

Jose, et al; Owning the Process Safety Moment: Real-Time Risk Management and Response; SPE SPE-168324-MS (2014); 12 pages.

Notification of Transmittal of the International Search Report and the Written Opinion of the International Searching Authority, or the Declaration; PCT/US2015/032103; Mail Date Aug. 25, 2015; 9 pages.

* cited by examiner

| MUD LOSS | | | | | |
|---|---|---|---|---|---|
| TYPE: DEMO | | | | | |
| SEVERITY: | | | | | |
| STATUS: | | | | | |
| OPENED ON: | | | | | |
| OPENED BY: | | | | | |
| ACKNOWLEDGED ON: | | | | | |
| ACKNOWLEDGED BY: | | | | | |
| LACATION: | | | | | |
| CLOSED ON: | | | | | |
| CLOSED BY: | | | | | |

| TASK | ASSIGNED TO | JOB | STATUS | END TIME | COMPLETED |
|---|---|---|---|---|---|
| — | — | — | — | — | — |
| — | — | — | — | — | — |
| — | — | — | — | — | — |

INCIDENT FORMS

DEPLOYED PROCEDURES AND TASKS

TASK OF DEMO

| TASK | ASSIGNED TO | JOB | STATUS | END TIME | COMPLETED |
|---|---|---|---|---|---|
| — | — | — | — | — | — |

SYSTEM AND METHOD FOR PROVIDING REAL-TIME MAINTENANCE, TROUBLE-SHOOTING, AND PROCESS ASSURANCE FOR THE OILFIELD

BACKGROUND

In the drilling and completion industry, the formation of boreholes for the purpose of production or injection of fluid is common. The boreholes are used for exploration or extraction of natural resources such as hydrocarbons—oil and gas, and/or controlled injection of produced fluids (water, CO2, etc.) for disposal, reservoir pressure maintenance or sequestration. Well construction, and subsequent production therefrom and monitoring thereof, involve expensive, time-consuming operations and personnel having varying degrees of knowledge with respect to certain facets of the operations. It is not always economically or operationally feasible to provide subject matter experts ("SMEs") onsite for the entirety of such operations.

Complex processes include various phases and a variety of serial and parallel steps performed in each phase. Pertinent data or information is collected during the various process steps and used separately or in conjunction with other real-time or historical information to make decisions relating to the process. Often different individuals make decisions and perform different steps and at different locations, that can have a bearing on the outcome of other steps in the process. Sometimes different security levels are associated with different personnel, in that restrictions are imposed to filter which persons are privy to what type of data and which persons are authorized to make what decisions. One such process is the process of recovering hydrocarbons (oil and gas) from subsurface formations. Such a process includes drilling of a well or wellbore at a selected drilling site from a drilling platform, completing the wellbore for production, producing hydrocarbons from the competed well, monitoring production and performing secondary recovery operations (fracturing, stimulation, workover etc.). The drilling process alone generally involves various entities, such as one or more oil companies as the primary operator, drilling contractors to perform drilling operations, service companies to perform different operations based on the respective company's services or proprietary technologies, regulatory bodies and various other subcontractors. Decisions are made and action executed by a variety of personnel prior to and during the well life cycle, planning, drilling, completions, production and abandonment activities. For example, the oil company engineers may make early decisions relating to the location and profile of the well based on a variety of data, including, but not limited to, seismic surveys, data from nearby wells, environmental impact studies, and governmental regulations. Drilling contractor personnel perform drilling operations and make many decisions relating to the drilling operations based on real-time and other information, including, but not limited to, decisions made by the operators, downhole and surface sensor measurements, information relating to nearby wells, information received from remote locations, such as service companies, and measurements provided by service companies. The drilling site includes a platform, a communications and control room with a variety of screens that display images of measurements of parameters relating to a drill string used for drilling the wellbore and parameters relating to the formation through which the well is being drilled. Decisions are made in meetings held among specialists from one or more entities and are then communicated to the platform. Communications among various personnel occur over different communication modes, such as audio conferencing, video conferencing, electronic mail (email), etc., and such information is available in fragmented form. Some of the real-time information is not captured. Additionally, various types of interrelated information are not available in time-synchronized form and integrated or correlated form for real-time use or for performing analysis.

The art would be receptive to improved or alternative systems and methods for providing real-time maintenance, trouble shooting, and process assurance for the oilfield.

BRIEF DESCRIPTION

An operation, communication, and executions facilitation system includes at least one modular system device including at least one onsite fixed-base camera configurable at an onsite location directed at job equipment for remote live operation viewing by at least one offsite actor, at least one onsite hand-held camera directable by at least one onsite actor at selected equipment for remote live viewing of custom images by the at least one offsite actor, at least one audio communication device usable by the at least one onsite actor, and at least one personal computer configurable to receive data from onsite equipment; a secured or dedicated network connected to one or more of the at least one modular system device; a data center in communication with the secured or dedicated network; and, at least one operations center at an offsite location configured to be manned by the at least one offsite actor and configured to receive data via the data center from the at least one modular system device; wherein two-way communication between the at least one offsite actor and the at least one onsite actor is accomplished through one or more of the at least one onsite hand-held camera, the at least one audio communication device, and the at least one personal computer.

A method of providing and facilitating real-time equipment maintenance, trouble-shooting, and targeted remote operational process assurance of an operation, the method includes selecting one or more modular system devices from a group including at least one onsite fixed base camera configurable at an onsite location to be directed at operation equipment for remote live operation-viewing by at least one offsite actor, at least one onsite hand-held camera directable by at least one onsite actor at selected equipment for remote live viewing of custom images by the at least one offsite actor, at least one audio communication device to be manned by the at least one onsite actor, and at least one personal computer configurable to receive data from onsite equipment; connecting the one or more modular system devices to a network; configuring a data center to be in communication with the secured network; and, manning an operations center at an offsite location with the at least one offsite actor, the operations center configured to receive, record, playback, transfer, and analyze data via the data center from the one or more modular system devices; wherein two-way communication between the at least one offsite actor and the at least one onsite actor is accomplished through one or more of the at least one onsite hand-held camera, the at least one audio communication device, and the at least one personal computer.

BRIEF DESCRIPTION OF THE DRAWINGS

The following descriptions should not be considered limiting in any way. For detailed understanding of the present disclosure, references should be made to the following detailed description, taken in conjunction with the accompanying drawings in which like elements have generally been designated with like numerals and wherein:

FIG. 5 is a diagrammatic screenshot of an exemplary embodiment of a workflow recording and reporting screen;

FIG. 6 is a diagrammatic screenshot of an exemplary embodiment of a multi-media recording and reporting screen;

DETAILED DESCRIPTION

A detailed description of one or more embodiments of the disclosed apparatus and method are presented herein by way of exemplification and not limitation with reference to the Figures.

To facilitate at or near real-time collaboration regarding maintenance, troubleshooting, and process assurance between oilfield personnel and subject matter experts ("SMEs") located at various support sites, the systems and methods described herein will provide the platform and the technical capability to enable an efficient interaction between the various parties. The system includes: interactive streaming and recording multimedia data (using fixed and/or hand-held cameras, audio communication devices, etc.) and relevant operational parameters from the oilfield site to subject matter expert; interactive dedicated two way audio between oilfield site and subject matter expert(s); interactive subject matter monitoring capability to see and hear what is going on with workflow application support that will allow the user to validate and verify that the appropriate job/actions are being taken at the oilfield site, especially those considered critical to wellsite operations; and recording and reporting of all multimedia, operational, and workflow data.

Figure 1:
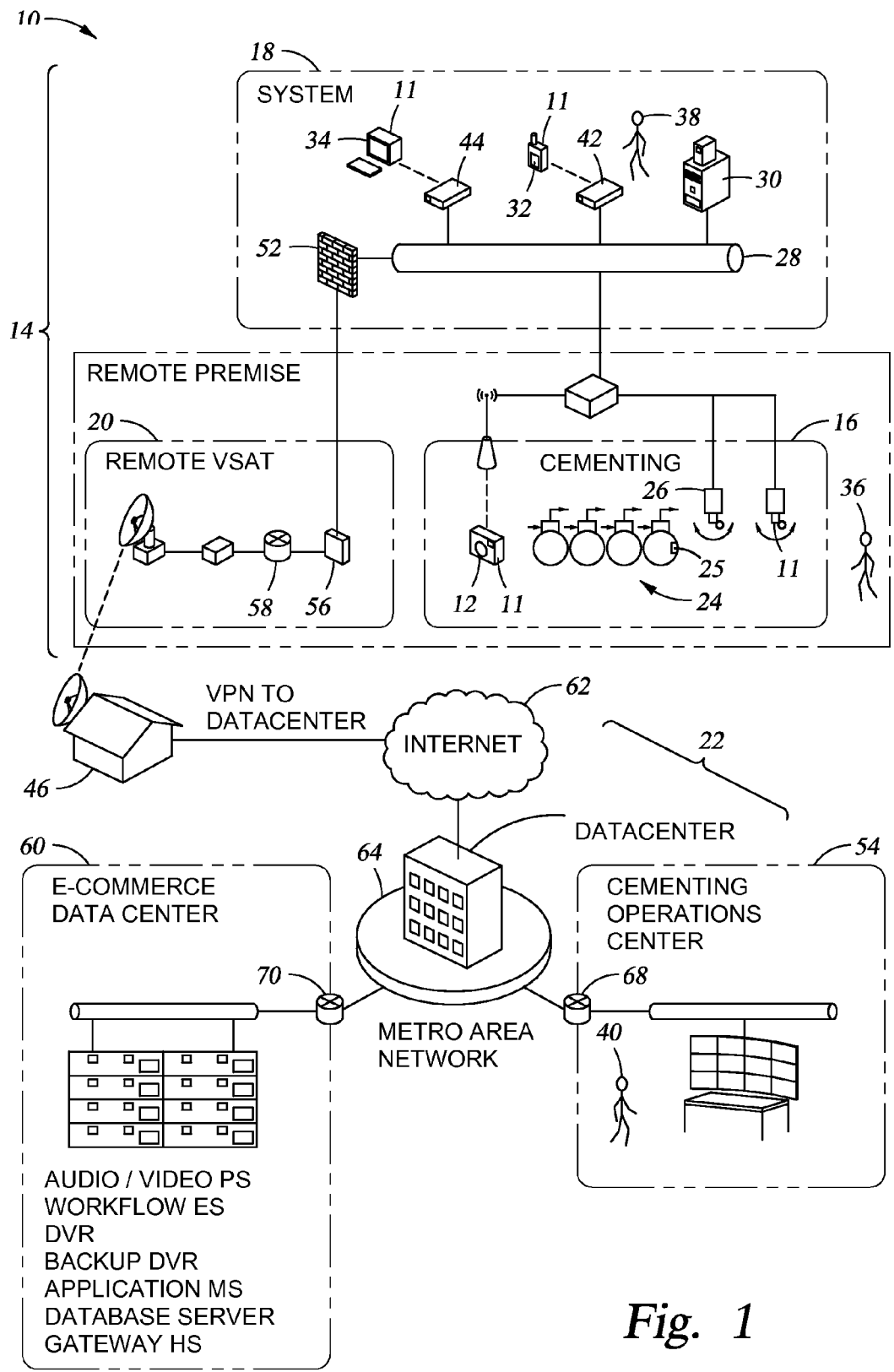
FIG. 1 is an exemplary wide area network ("WAN") data flow architecture diagram for an exemplary embodiment of an operation and communication system.

FIG. 1 shows an exemplary wide area network ("WAN") data flow architecture for an exemplary embodiment of an operation, communication, and executions facilitation system 10. It should be understood that alterations may be made for particular operations, and therefore the WAN architecture shown in FIG. 1 is for illustrative purposes only. For example, while a cementing operations is depicted in FIG. 1, other jobs and procedures may also take advantage of the operation and communication system 10, including, but not limited to, downhole drilling bottom hole assembly ("BHA") management, drilling fluids management, logging services, hydraulic fracturing and or Sand control services, upper and lower completion assembly and running, production chemical services, water management, blow out preventer ("BOP")/ram testing, and other downhole and surface activities not specifically listed herein. Also, the system 10 may include any number of modular system devices 11 including hand-held cameras 12, fixed base cameras 26, audio communication devices 32, and personal computers 34. Further, while only one onsite or on-premise hand-held camera 12 is shown, it should be understood that the depiction of one camera 12 is for exemplary purposes only, and that any number of features shown in the WAN architecture of FIG. 1 may be included in plurality. A particular operation and/or customer requirements will dictate which and how many of the modular system devices 11 to employ. Also, while the onsite location is noted at 14, it should be understood that the onsite location 14 may be divided across different areas, such as a job area 16 where the actual operational process (e.g., cementing job) is taking place, an organizational area 18 where audio and visual data is recorded and received, and a communication area 20 enabling transfer and receipt of data between the onsite location 10 and one or more offsite locations 22.

On site or on-premise, at least a portion of the cementing unit 24 (or other systems and devices to be monitored), will be within sight of one or more fixed base cameras 26 for remote, live operation viewing. By "fixed" it should be understood that the cameras 26 may include movable devices that are remotely steerable with respect to their fixed base to alter a viewing angle. Further, at least a portion of the cementing units 24 or job area 16 may be selectively image-captured by one or more on-site handheld cameras 12 for remote, live viewing of custom images involved in difficult to reach or remote locations on the platform, or remote facility. The hand-held camera 12 enables both live mobile video and still pictures, two-way communication through camera 12, and two-way on-screen image annotation. One exemplary embodiment of such a hand-held camera 12 that may be employed for this purpose is the Onsight™ camera, available from Librestream.

The data provided by the fixed base cameras 26 and the handheld cameras 12 is sent over secured network 28. For example, 192.168.1.0/24 is the prefix of the Internet Protocol Version 4 network starting at the given address, having 24 bits allocated for the network prefix, and the remaining 8 bits reserved for host addressing. Both the fixed base cameras 26 and the hand-held cameras 12 communicate over network 28 with at least one server 30, at least one audio communication device 32 for 2-way communication, and at least one personal computer 34. The server 30 may be a virtual machine digital video recorder application management server. The audio communication device 32 may be a radio that provides push-to-talk access between onsite or on-premise personnel or onsite or on-premise actors 36, 38 and offsite personnel or offsite actors 40, such as off-shore rig personnel and on-shore personnel, and communicates with the network 28 via the IP gateway 42. Further, software may be incorporated to convert cell-phones, tablets, and PCs into two-way radios for providing the audio communication devices 32. The PC 34 may receive, view, store, analyze, and send pumping data or other operational data from the cementing units or job equipment 24, and communicate with the network 28 via the screen encoder 44. A screen encoder 44 may also be used for on-land computers that are aggregating data from the rig-site. A screen encoder attaches to a monitor displaying data and scrapes/copies the screen and transmits it as a video file that is time synchronized into the video aggregation/recording system. This allows an operator to tap into data screens that are otherwise not directly integrated to. This function can be performed on rig side monitors or onshore monitors that are displaying rig-side data.

The operation and communication system 10 will further include access to secured satellite Internet, although in some embodiments the communication protocol may also or alternatively travel through fiber, corporate networks and land based networks. Satellite Internet generally relies on three primary components including a satellite in geostationary orbit or a geosynchronous Earth orbit (not shown), at least one ground station known as a gateway, e.g. satellite hub station 46, that relays Internet data to and from the satellite via radio waves, and a very-small-aperture terminal ("VSAT") dish antenna with a transceiver 48, located within an onsite satellite communication system 50 in the communication area 20 at the onsite location 14. Firewall 52 is interposed between the onsite satellite communication system 50 and the network 28. The firewall 52 performs Internet Protocol blocking to protect the network 28 from unauthorized access. That is, the firewall 52 controls access to the network 28 based on the IP address of a client computer, such as a computer at the operations center or centers 54. The onsite satellite communications system 50 may communicate with the network 28 via switch 56 and router 58.

The onsite satellite communications system 50 will allow communications between the PC 34, audio communication device 32, server 30, fixed base camera 26, and hand-held camera 12 of the system 10 and operations center 54, such as but not limited to a cementing operations center, and a data center 60. As shown in the WAN data flow architecture of the operation and communication system 10, this is accomplished with satellite hub station 46, which communicates over the Internet 62 to a data center 66 connected to a service provider's area network 64 of the operation and communications system 10. The operations center 54 and data center 60 are connectable to the network 64 via routers 68, 70, and thus are in communication with the PC 34, audio communication device 32, server 30, onsite fixed base camera 26, and onsite hand-held camera 12 via the Internet 62 and satellite communication system 50 and satellite hub station 46. The operations center 54 may use and incorporate mobile video viewers and telestration screen encoders, IP dispatch consoles, incident response apps, and synchronized audio/video players. The center 54 is further a location for subject matter experts to view the data and images from the onsite location 14 and provide appropriate feedback. The data center 60 may include audio/video playback server, workflow engine server, digital video recorder, backup digital video recorder, application management server, database server, and gateway host server.

Figure 2:
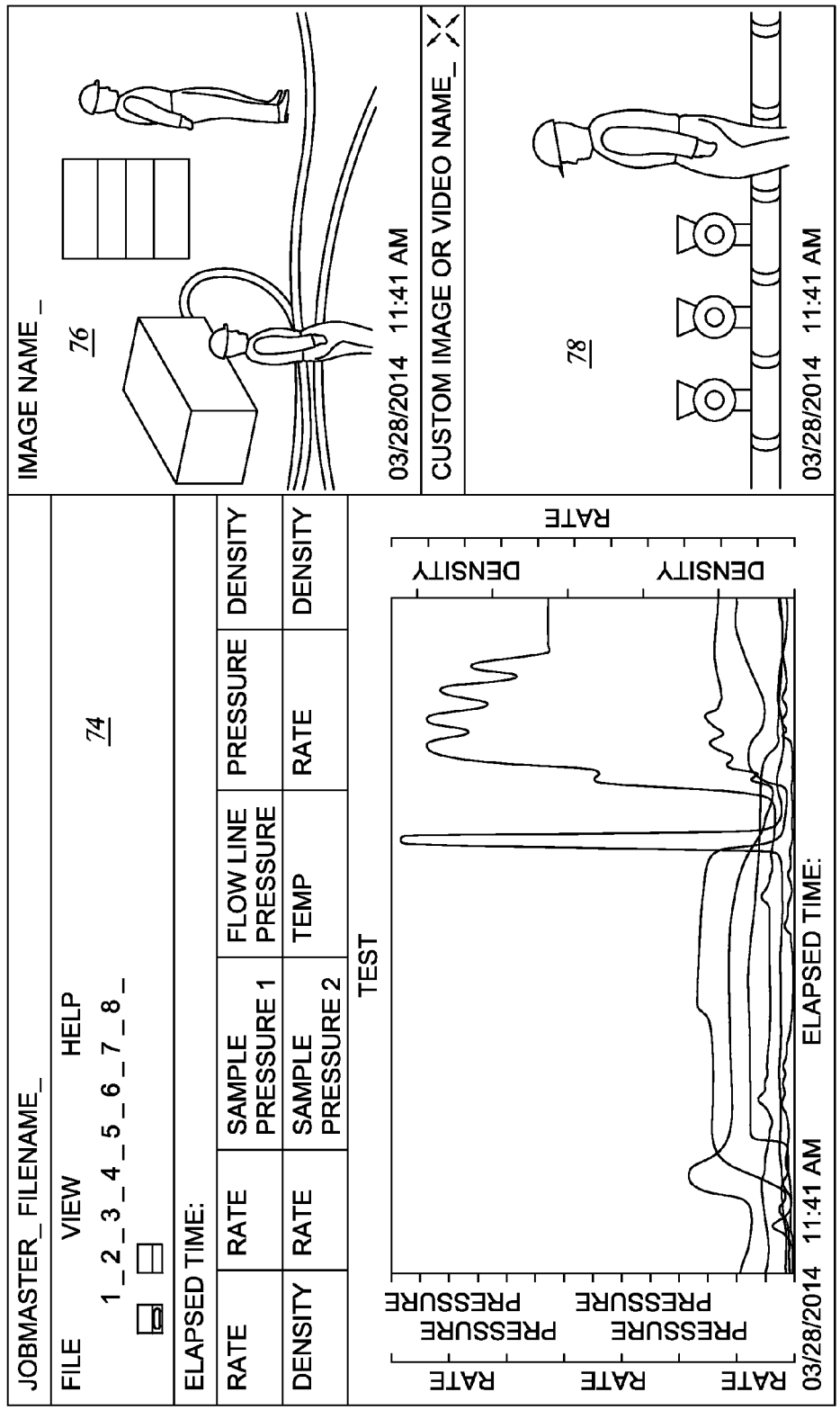
FIG. 2 is a diagrammatic screenshot of an exemplary embodiment of a remote SME visualization screen.
Figure 3:
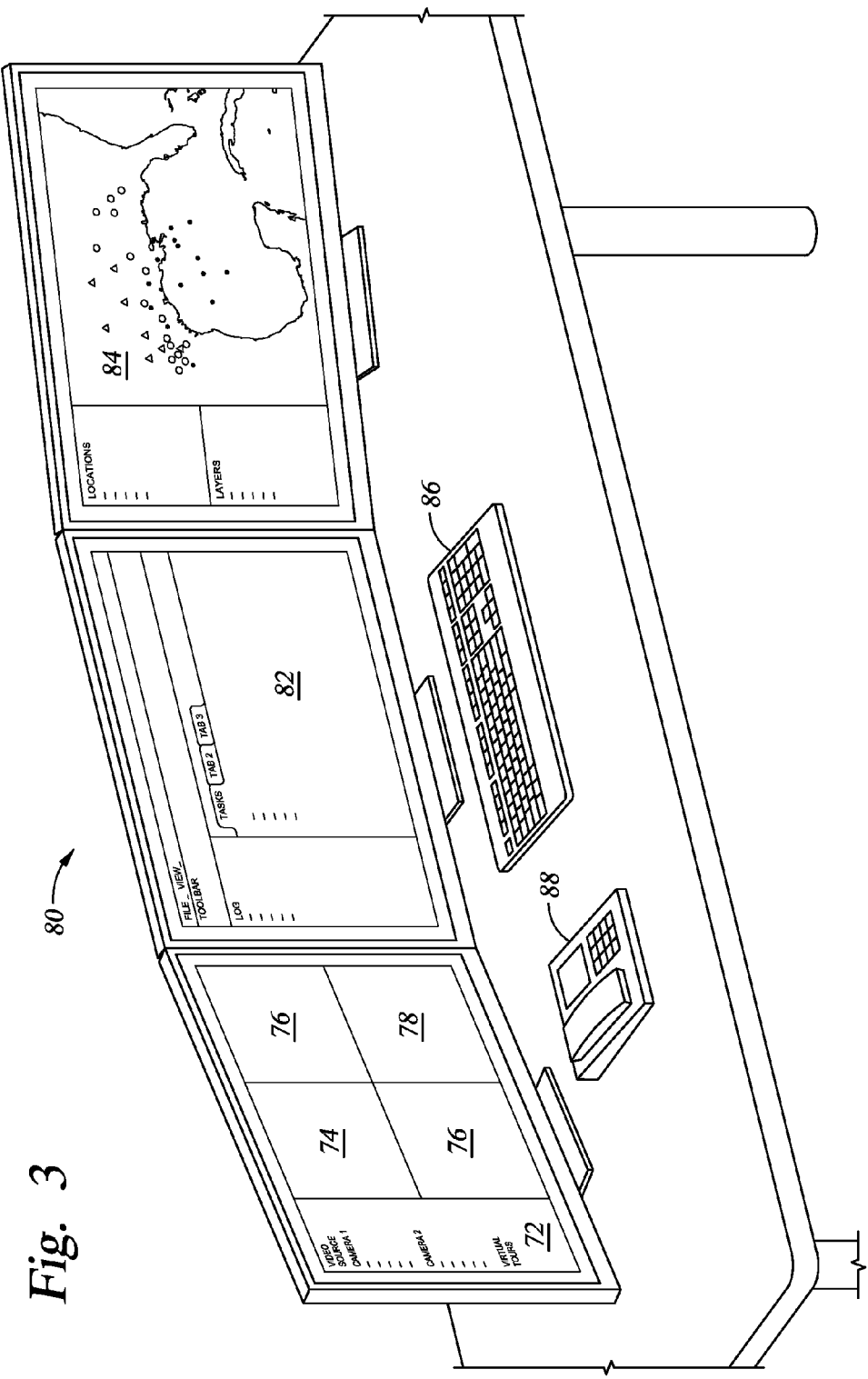
FIG. 3 is a perspective view of a portion of an operation center.
Figure 4:
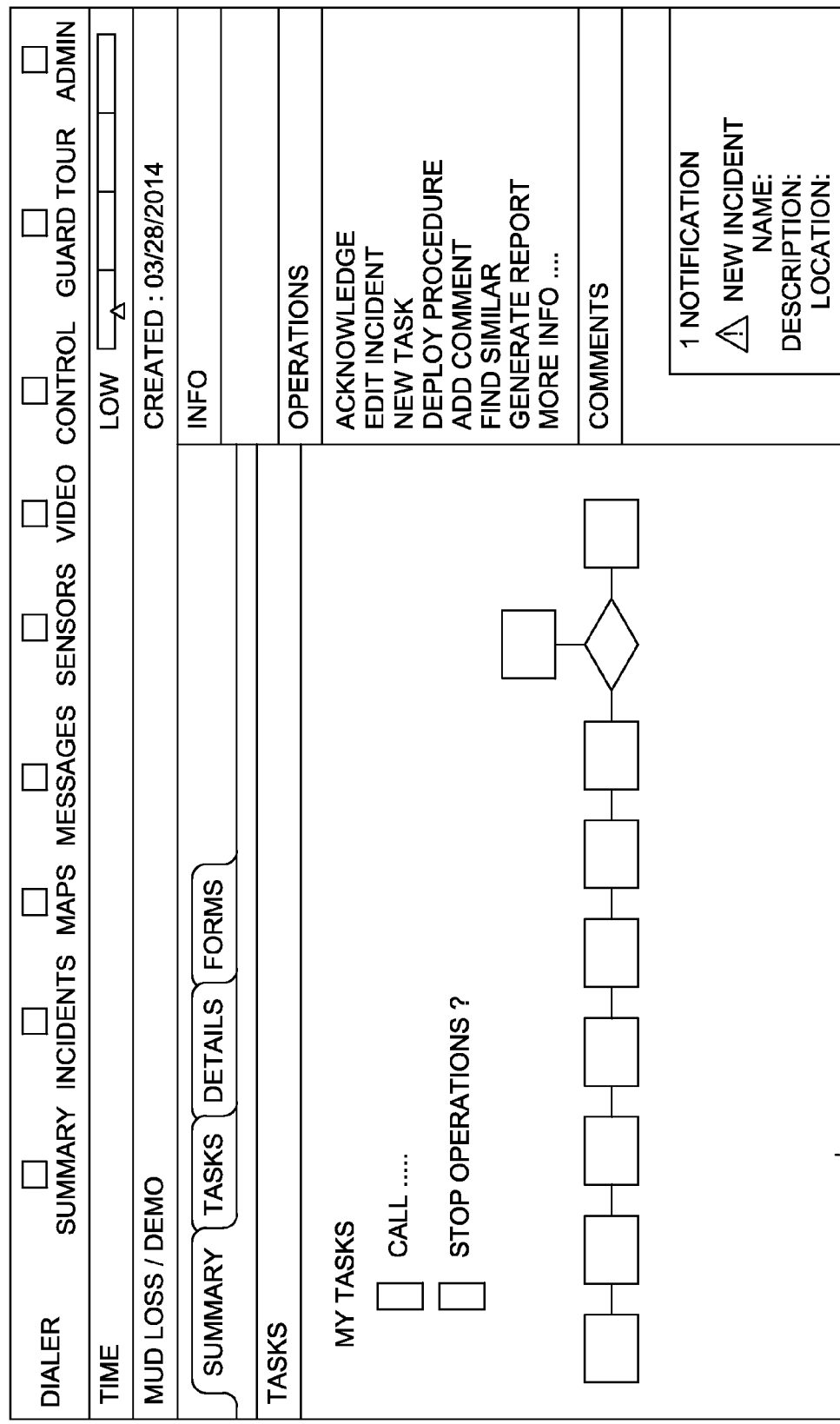
FIG. 4 is a diagrammatic screenshot of an exemplary embodiment of a workflow engine screen.
Figure 6:
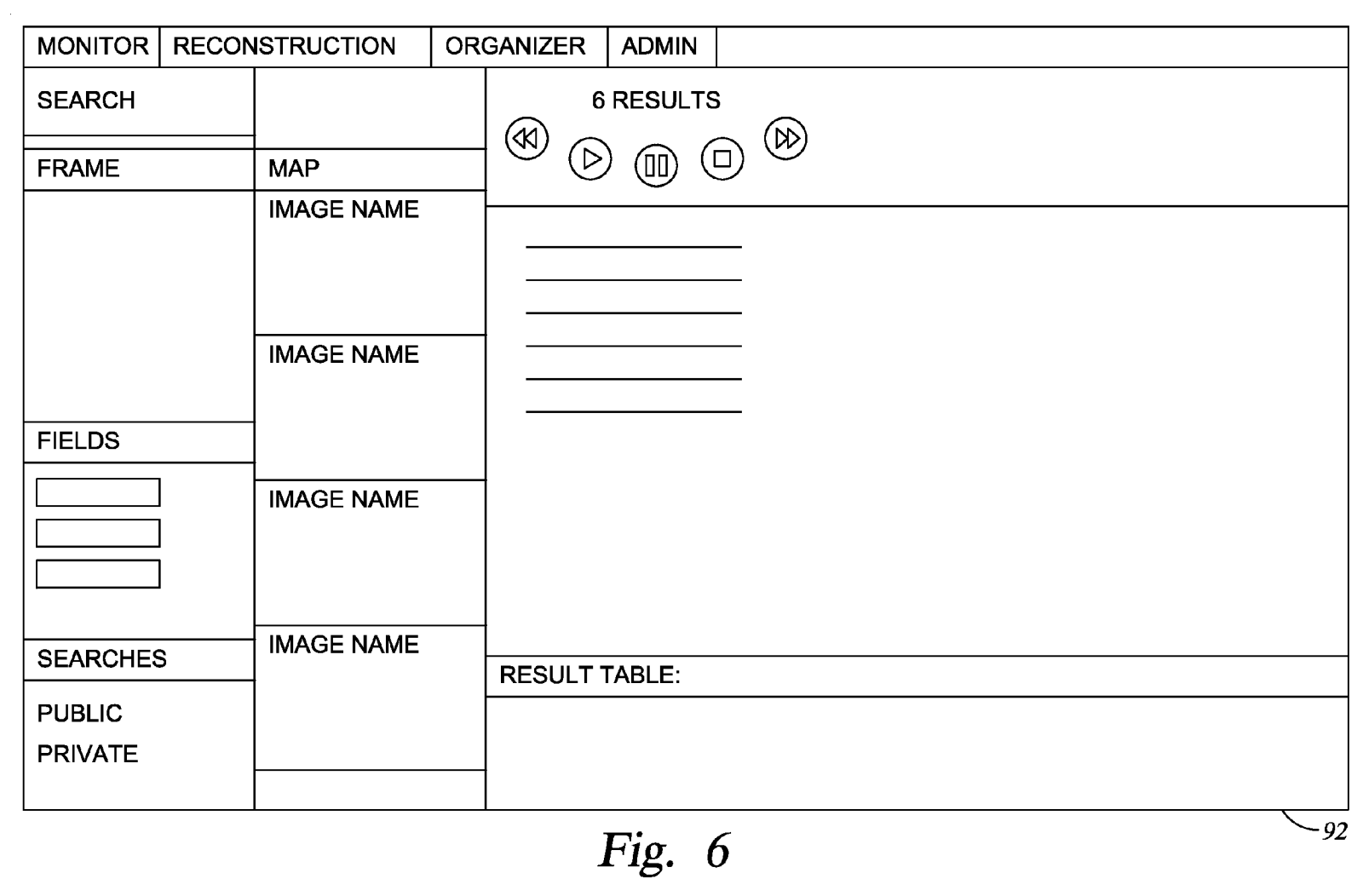

FIG. 2 shows one exemplary embodiment of an offsite SME visualization screen 72. Data from sensors and process results are shown in one portion 74 of the screen 72, while a fixed base camera 26 shows an image in another portion 76 of the screen 72, and a custom image taken by an onsite actor 36 using a hand-held camera 12 is shown in yet another portion 78 of the screen 72. Sensors 25 are illustrated, for exemplary purposes only, at the cementing unit 24, however many other sensors may be provided within a borehole, and associated with downhole equipment and/or other operational equipment or its surrounding environment. Thus, sensors 25 are meant to encompass any such sensors. The offsite SME visualization screen 72 may be just one screen available to the offsite actor 40. FIG. 3 shows an exemplary embodiment of an offsite SME visualization station 80 including the SME visualization screen 72 providing video and sensors monitoring, a workflow engines screen 82 displaying adaptive response workflows, and a map visualization screen 84. The offsite SME visualization station 80 further provides data entry area 86, such as a keyboard, and audio communication access 88. One or more offsite SME visualization stations 80 may be provided. An exemplary embodiment of a workflow engine screen 82 is shown in FIG. 4. The screens 72, 82, 84 may alternatively or additionally display recording and reporting screens, such as shown in FIGS. 5 and 6. FIG. 5 shows an exemplary embodiment of a workflow recording and reporting screen 90, and FIG. 6 shows an exemplary embodiment of a multi-media recording and reporting screen 92.

The operation and communication system 10 will connect and transmit data from certain oilfield side collaboration technologies such as fixed base cameras 26, hand-held cameras 12, and audio communication devices 32 to the subject matter expert 40 (one of the off site actors) in a bi-directional fashion. This data along with the relevant operational or sub-surface data will be transmitted and recorded in real-time to the subject matter expert 40. The subject matter expert 40 will be able to enhance his visual and audio experience by following the activities of the oilfield personnel 36 (one of the onsite actors) using a workflow engine that is time synchronized with the video and audio data, as will be further described below with reference to FIGS. 7 to 10. To allow for interaction and collaboration, the subject matter expert 40 and the oilfield personnel 36 will leverage the technical platform to engage in two-way audio and visual communication as needed. The operation and communication system 10 will allow for both multi-media and paper based reporting of the recorded data between the two parties 36, 40, such as depicted in FIGS. 5 and 6.

Systems and methods for integrating and using information are further described in U.S. Patent Publication US 2012/0143899 to Arango et al., which is herein incorporated by reference in its entirety. The concepts, systems and methods disclosed herein are generally applicable to information generated in any process. Such concepts, systems and methods are particularly applicable to complex processes, including, but not limited to, the oil well-related processes, such as well-drilling, cementing services, well-completion (hydraulic fracturing, stimulation, etc.), well testing, well maintenance and well monitoring as well as live training support. The system and methods disclosed herein are equally applicable to other business, industrial and commercial processes that utilize information and data in a variety of forms during various steps of the process. Systems and methods for capturing (recording) video information, still images (pixels), audio information (such as conferences, voice messages, etc.) and text (written) information relating to a process such as from emails and other documents) is provided. In the case of a well drilling process, such information includes, but is not limited to, screen shots at well site, audio and video information at well site, well logs, decisions made and the identity of persons making such decisions (written or verbal), conformation of task(s) completions, data from remote locations (such as operators, service companies, etc.), historical data, data from near-by wells (for example, seismic data), regulatory information and compliance data. During post-drilling operations the captured or obtained information may include, but is not limited to, monitoring data (surface and subsurface), decision data, cementing services and hydraulic fracturing and stimulation data, all in any suitable form (audio, video and text). The information captured relates to both subsurface and surface activities. In aspects, the captured information is enhanced, such as by time-synchronizing the captured information, integrating or correlating the captured information and/or time-synchronized information in a useful form and providing a variety of manners in which the enhanced information may be utilized by authorized users. The correlation may be based on one or more selected criteria, including, but not limited to, time, persons (actors) originating or involved in generating the information or performing an act, activity type, and place of occurrence (venue). In aspects, the system may provide access to the integrated and correlated information to individuals to the extent of their pre-authorization. The user, in aspects, may interface with the captured and enhanced information in a variety of ways, For example, a user may query information in a variety of ways, including, but not limited to, key-word, time, activity type or subject matter, person's name, place of activity, process step, audio relating to an activity, video relating to an activity, a parameter relating to the process, and all or a portion of the information. In another aspect, the user may view the information in a variety of manners, including, but not limited to, ability to play back, fast forward and pause while viewing such information. Such playback features may be provided in real or near-real time and/or at later times. In other aspects, based on the authority or clearance level, the system supports editing (make corrections, add comments, etc.) and send such edited information back to the system for storage.

In aspects, the video information, screen shots, audio information, such as from meetings or conferences, text information, such as from emails, may be captured and recorded using any suitable method or devices. Emails may be just one of the information sources for people executing steps of a business process, such as an oil and or gas well process or activity. This information may be obtained through software screen captures or agents, or through hardware devices added to the audio and video systems. The information may be captured and transmitted in real or near-real time to a central source, recorded locally for later transfer or it may be transferred as the bandwidth becomes available via an appropriate quality of service setting. Because, the information captured for a complex process, such as a well process, can be extensive, a Data Drizzle technology may optionally be utilized. Data Drizzle technology enables a digital video recorder to operate without interfering with the bandwidth needed for real time operations, wherein data is transmitted a bit at a time, over time. It utilizes more bandwidth when available, and very little or none when the connection is busy. In another aspect, the captured and enhanced information may be compressed as various snapshots of the video data contain much common information and a differential comparison of screens allows a relatively small portion of the data to be transmitted in a compressed format. In other aspects, the system may perform time synchronization across systems to create a unified view of the video and audio information and display the same at points in time. It also may include built-in correction for time errors across systems by sending synchronizing audio sounds and/or video images to multiple systems. These artifacts may be used to correct a time offset and compute and correct for time drift.

The system may further record the identity of individuals using and contributing data and decisions. The system may further archive the recorded and integrated information along with the identity of individuals who have who have the right to access and the extent of such right to the information and under what conditions. The system allows access to the captured and integrated information based on access control rules. The system may further include record and escrow information to determine whether the information has been altered and log such acts and determine the identity of the person or persons who performed such acts and the timing of such acts. The system may optionally link any additional data (such as sensor data) from other systems (such as PLC and controls systems) into the sequence of screen shots and audio data to determine additional system status at the time of recording. The above-noted and additional features of the disclosure herein are described below in reference to FIGS. 7-10 relating to an exemplary well process for ease of explanation and not as any limitation. It should be noted that the concepts, systems and methods disclosed herein are equally applicable to other business, industrial, commercial and manufacturing processes.

Figure 7:
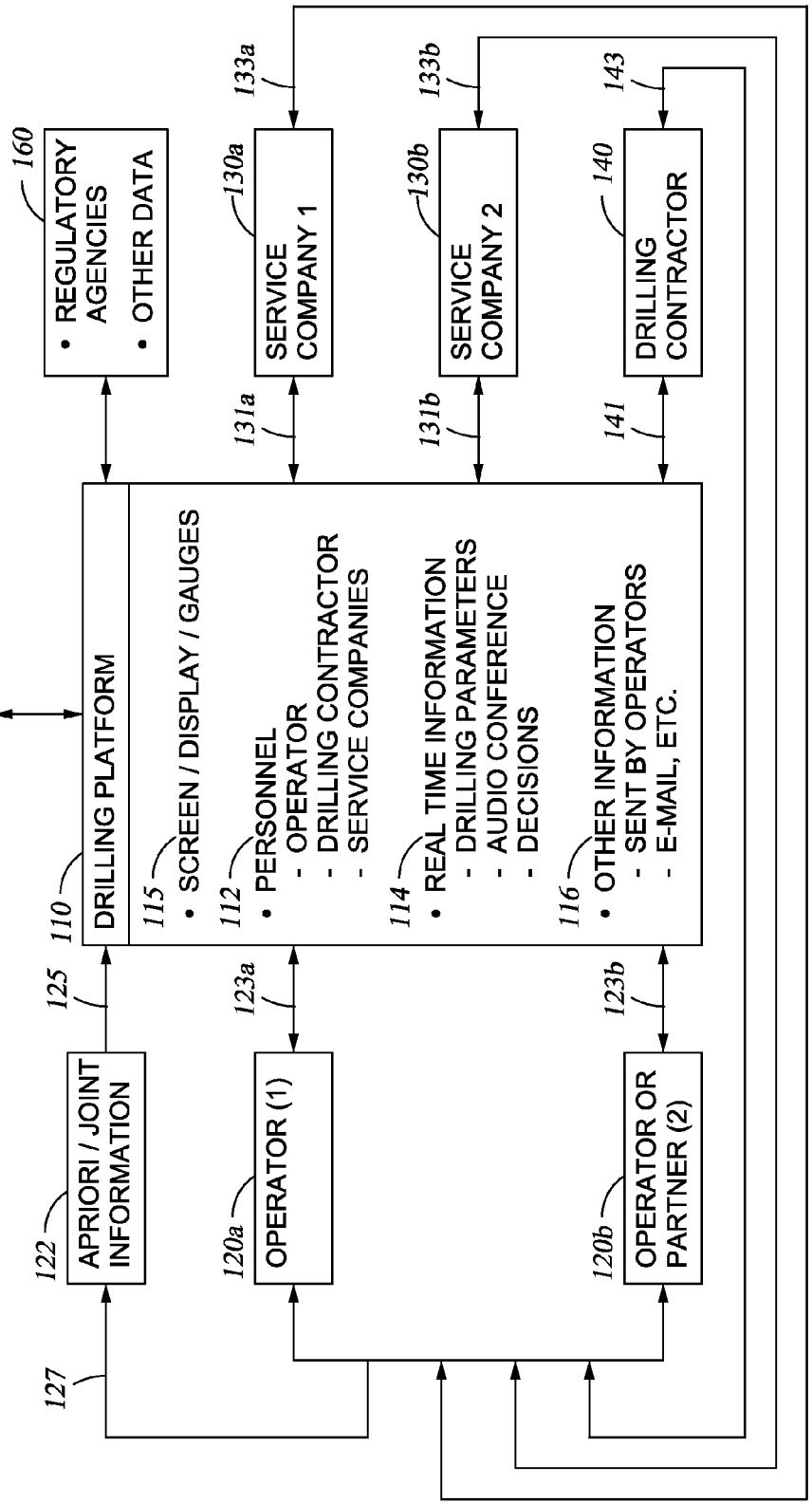
FIG. 7 is a functional block diagram of an exemplary well-drilling process about which information may be captured, integrated and used according to the various aspects of this disclosure.

FIG. 7 is a functional block diagram of an exemplary well drilling process 100 for which information may be captured, integrated, enhanced and made available for use by one or more parties according to the various aspects of this disclosure. The well drilling process 100 is shown to include a drilling platform (or platform) 110 at which actual well drilling activities occur. The platform 110 includes a rig and drilling equipment (not shown) for drilling wellbores. Typically, one or more operators, such as oil companies, contract with a rig operator to drill the well based on the design and other criteria provided by the operators. FIG. 7, as an example, shows two operators 120a and 120b who may have a joint development agreement that specifies the relationship between the operators relating to the drilling and completion process. Such agreements are typically confidential to operators. The operators communicate with each other via a suitable link 121 that may include video links, teleconference links, email and the like. The operators 120a and 120b provide information to the drilling contractor prior to the drilling of the wellbore as shown in box 122 via communication links 125 and 127. Such information may include a desired well profile to a desired depth and may include images and drilling criteria, decision process, etc. Such information may be communicated in text, video and/or audio forms and may be communicated by any suitable method, including emails.

Still referring to FIG. 7, the drilling of the well is performed by one or more drillers based on the criteria provided by the operators 120a and 120b and using common drilling practices. The platform 110 includes a variety of display screens (or screens) and gauges 115 for displaying images of a variety of drilling aspects and/or parameters relating to the drilling operations and gauges that provide specific real-time measurement information to the drillers during drilling of the well. The operators and/or the drilling contractor also contract with other entities to perform a variety of functions relating to the drilling and completion of the well. For example, operators may contract with service companies to provide the drill string that includes a variety of sensors for making downhole measurements while drilling. Such measurements relate to the drilling of the wellbore and the formation through which the well is being drilled. Such measurements are generally referred to as measurements-while-drilling ("MWD") or logging-while-drilling ("LWD") measurements. Service company personnel 112 present at the platform typically interpret such information in real or near-real time and communicate the results to the driller 112 and the operators 120a and 120b. Such measurements are displayed on the screens 115 at the platform 110.

Thus, for a typical drilling operation, several images are simultaneously and continually or continuously displayed during the drilling process. The driller 112 makes ongoing drilling decisions based on real time downhole and surface measurements. Often, the operators 120a and 120b have remote offices that have experts that receive large amounts of data from the platform 110, including information about drilling parameters, MWD/LWD information, safety information, etc. Generally, the operators 120a and 120b are entitled to receive all data relating to the drilling and completion operations. The operators 120a and 120b individually or jointly communicate information and instructions to the personnel at the platform via two-way communication links 123a and 123b. Also, service companies 130a and 130b may have remote offices that receive information relating to the respective services provided by them. Communication link 131a provides two-way communication between service company 130a and platform 110, while link 130b provides the two-way communication between service company 130b and platform 110. Links 133a and 133b respectively provide two-way communication between the service companies 130a and 130b and the operators 120a and 120b. Similarly, drilling contractor personnel at remote location 140 may communicate with the platform 110 via link 141 and with the operators via link 143. The system may have role-based authentication which would limit who can see what data, which may become important when collecting and transmitting sensitive data. Information received at the platform other than that generated at the platform is designated as 116. In addition, often in a well drilling process, historical information, information from other wells and certain other information (collectively designated as 150) is utilized. Such information may include, but is not limited to, seismic data from nearby wells, placement of a nearby well, data (such as pressure and temperature gradients from previously drilled wells, rock formations at various formation depths, etc.). In addition, there may exist a body of regulations (for example, governmental or industry standards) 160 for various phases of the well process. Also, audit information may be available during the process. The system 100 also captures such information from the available sources. In addition, the system may be configured to capture value added information created during the process. Such information may include, but, is not limited to, quality control data and cautions and warnings issued, such as alarms activated and red flags raised during drilling.

Still referring to FIG. 7, at any time during the drilling process 100, images about various drilling aspects are displayed on various screens. Sequential images relating to a particular aspect are referred to as serial images and series of images relating to different images along the same time period (time line) are referred to as parallel images. An image may be related to or correspond to one or more variables. For example, an image of a downhole measurement is typically taken at a certain well depth (distance from the surface) and at a certain time. Thus, such an image corresponds to at least two variables, i.e., well depth and time. If a particular person (also referred to herein as an actor) provided some useful information or made a decision relating to that image, then such image also correlates or corresponds to that person. Additionally, such an image may also correlate to audio information, for example, a conference among individuals relating to a decision made. Thus, an image in a process, such as a drilling process, may be stand alone or may correspond to or be related to one or more variables, including time, place (such as well depth), one or more actors, audio information and written information. The enhancements herein may include integrating/correlating any other desired data, such as quality control analysis data, alarms and warnings occurring relating to one or more steps of the process. Also, it is common in complex processes for various personnel and/or associated computer systems to analyze the data in real-time, near-near-real time and/or at a later time date. Such analysis may, for example, include analyzing patterns, performing statistical analysis, and providing opinions and predictions. The system herein may also be configured to capture such data and integrate with other data. The system and methods for capturing or recording, enhancing (integrating/correlating) and using such information is described in reference to FIGS. 8-10.

Figure 8:
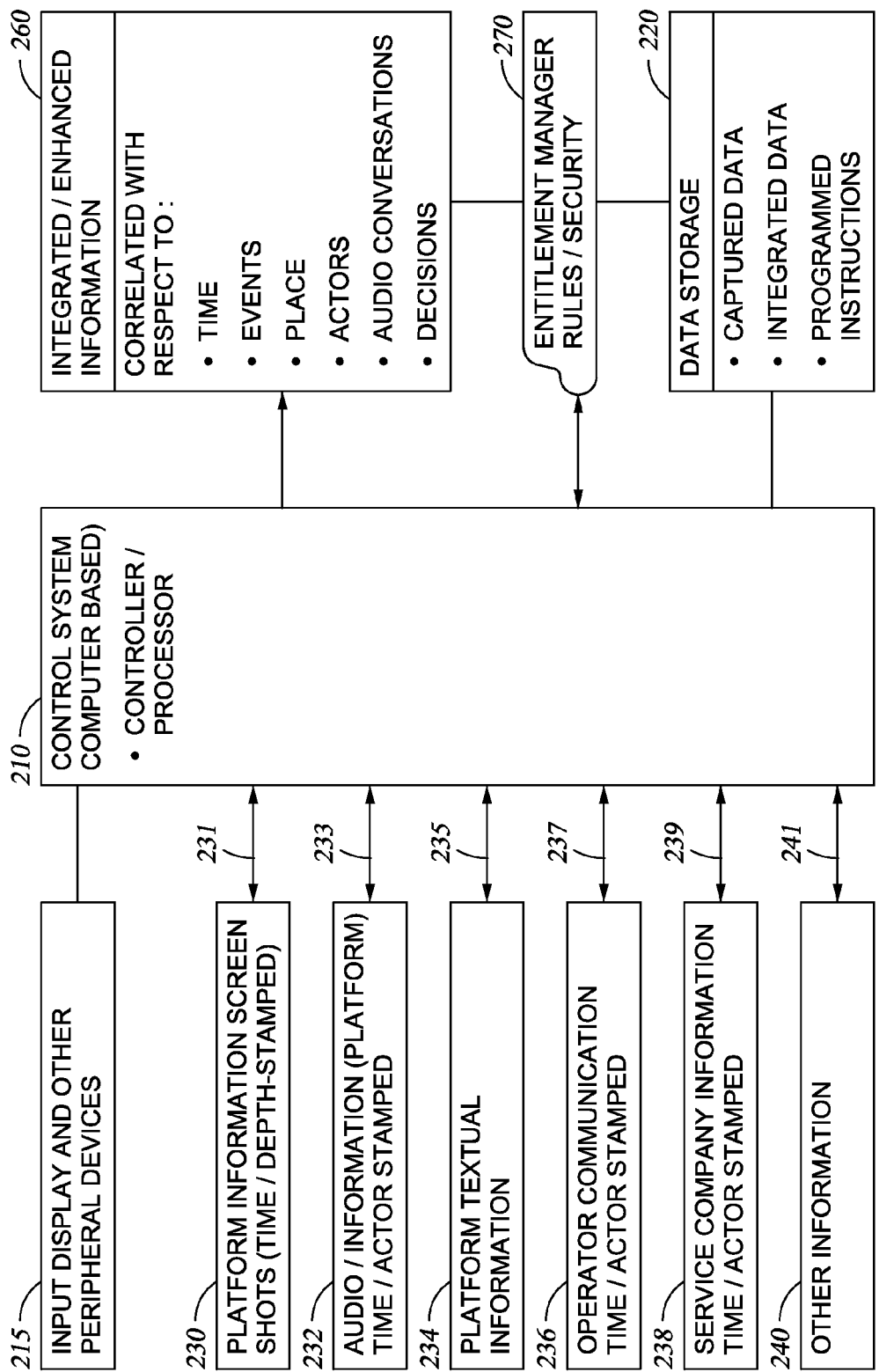
FIG. 8 is a functional block diagram of a system that may be utilized to capture, escrow and integrate information relating to a process, such as the process shown in FIG. 7.

FIG. 8 is a functional block diagram of a system 200 that may be utilized to capture or record, escrow and integrate information relating to a process, such as a drilling process shown in FIG. 7. The system 200 includes a control system or controller 210 that, in one aspect, may be a computer-based system that includes input, display and other peripheral devices 215 and a data storage device 220. The control system 210 is configured to capture all desired data and information from a well process, such as the drilling process described in reference to FIG. 7. The control system 210 may be configured to capture any information from the well process 100 shown in FIG. 7, including information at any location on the platform 110, and from operators, service companies, drilling contractors and the like. In FIG. 8, the control system 210 is shown to capture the images (screen shots) 230 at the platform via a communication link 231, audio information 232 from the platform 100 via link 233, text information 234 from the platform via link 235. Information, such as audio and text information from the operators 236 is received via link 237. Service company information 238 is received via link 239. The system 210 also may be configured to receive any other desired information 240 relating to the process of FIG. 7 via link 241. In one aspect, the images captured in real-time or near real time are time-stamped at the moment of capture. In one aspect, the images are time-stamped at the time they are generated. The audio information and the text information may also be time-stamped in the manner images are time-stamped. In addition, the control system 210 captures information about the identity of the actors relevant to the captured information. For example, the system 210 captures the identity of the persons responsible for making a decision in captured audio information or identity of the persons manning a station at the platform 100. Additionally, in certain aspects, it may be desirable to capture the location or place of the captured information, for example the platform 110, operator's remote office, etc. In the case of downhole information, the well depth corresponding to such information may be recorded. In general, the control system 210 may be configured to capture a variety of information relating to various steps of the process on an ongoing basis in real time or near real time. Additionally, other information may be provided to the control system 210 at different discrete times.

Figure 9:
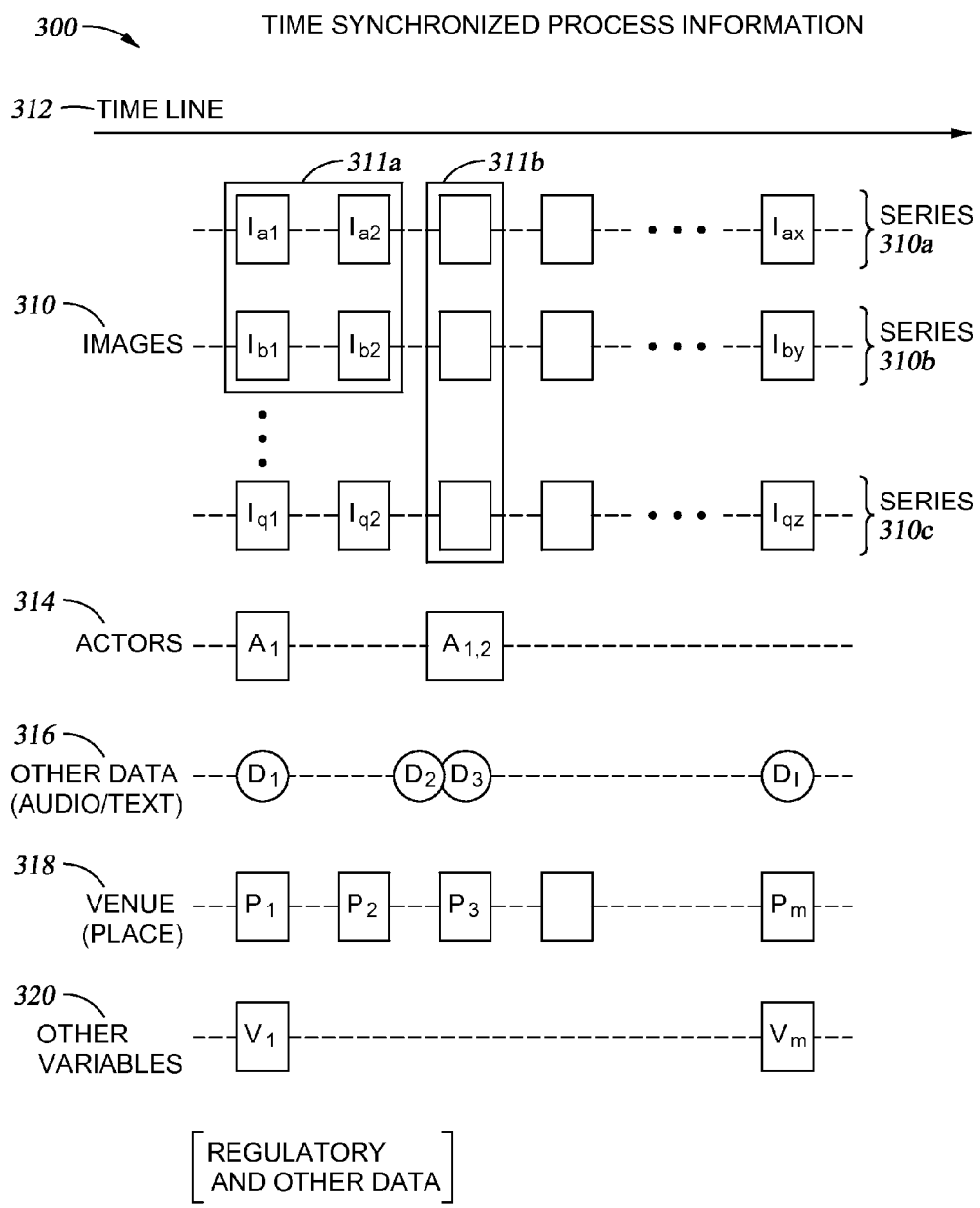
FIG. 9 shows a method of integrating captured video or visual images with other forms of captured information, according to one aspect of the disclosure; and, FIG. 10 is a functional block diagram of a system that may be utilized for providing access to the captured and integrated information provided by the system of FIG. 8 based on one or more selected rules, according to one embodiment of the disclosure.

Still referring to FIG. 8, the control system 210 archives or stores the received information in the storage device 220. The control system 210 integrates the various forms of captured information. FIG. 9 shows an example of the integration of the captured information, according to one aspect of the disclosure. The images 310 relating to a particular aspect of a process are shown in a sequential order I1, I2 . . . Ij. Such images have corresponding times (312) that are shown as T1, T2 . . . Tk. When each image has a corresponding time, j will equal k. However, if some images do not have a time-stamp, j and k will have different values.

Often one or more actors may be associated with a particular image. FIG. 9 shows association of images with actors 314. Actor A1 is shown associated with image I1 and Actors A2 and A3 with image I3. In the particular scenario of exemplary FIG. 9, the remaining images do not have any associated actors. Audio and text data 316 associated with the images also may be integrated with their corresponding images. FIG. 9 shows that data D1 is associated with image I1, part of data D2 and all of data D3 are associated with image I3, while other images do not have any other associated data. Similarly, the location of the information captured may be associated or integrated with the images. As an example, FIG. 9 shows places P1, P2 . . . Pm are associated with images I1, I2 . . . Ij. Any other variables, such as V1, V2 etc., may also be integrated with the images. In this manner all relevant information relating to particular aspect or event of a process may be integrated into a common information set that may be made available or presented at the same time or substantially the same time.

Referring back to FIG. 8, the control system 210, in one aspect, integrates or correlates the captured information in a manner described in reference to FIG. 9 as shown in block 260 and stores such integrated information in a the storage medium 220 or another suitable medium. In another aspect, the control system 210 has access to rules or criteria that define which party is entitled to what type of captured information and integrated information. Such rules may be provided to the control system 210 via an entitlement manager 270 or by another suitable manner. The entitlement manager receives inputs from one or more selected parties, such as the operators, service companies, etc. The control system 210 may be configured to provide in real-time or near real-time selected information as feedback to the various parties shown in FIG. 8, based on the rules dictated by the entitlement manager 270. Such information may then be utilized by such parties in making decisions regarding taking further actions relating to the drilling process and/or for auditing and forensic purposes.

Figure 10:
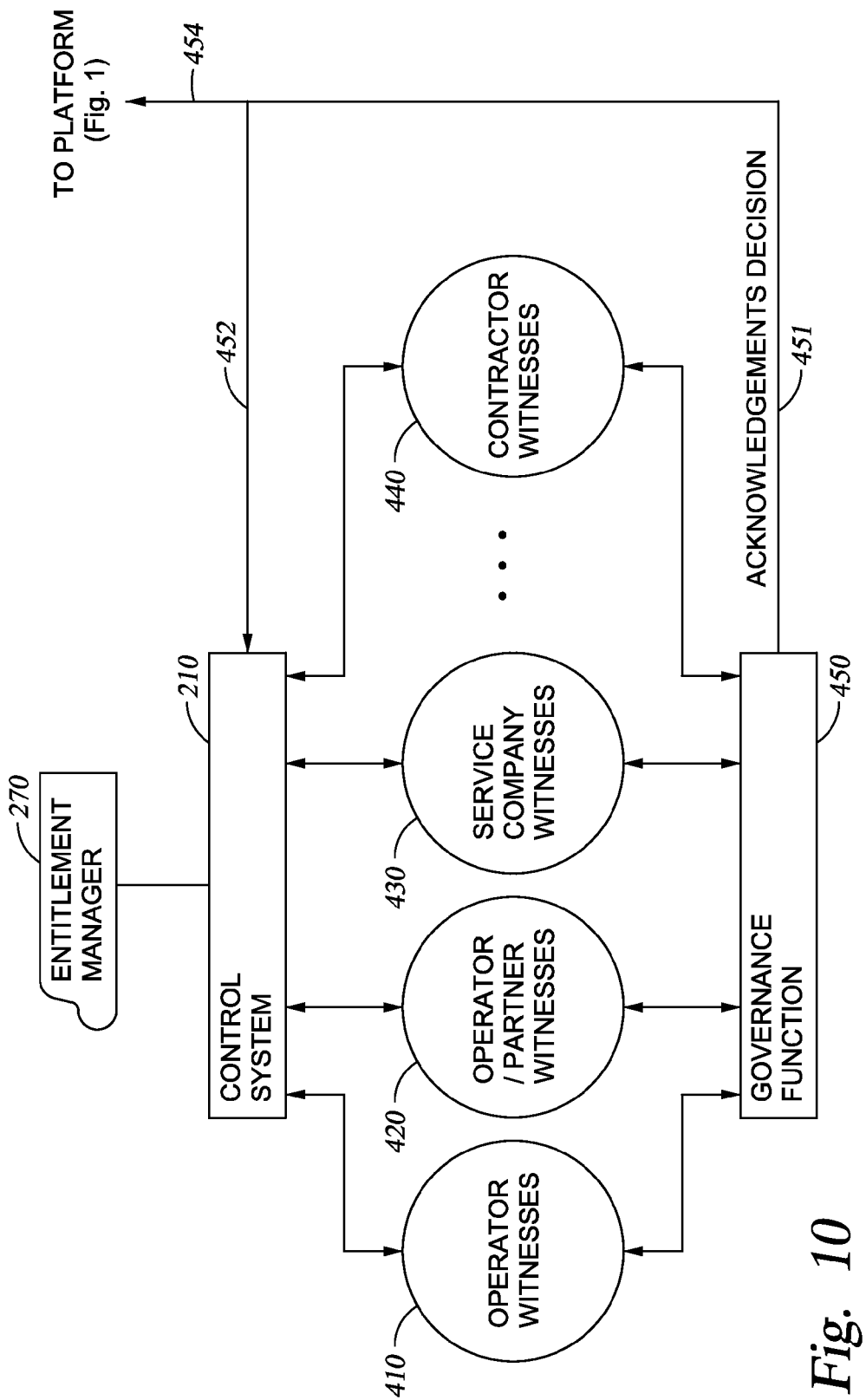

FIG. 10 is a functional block diagram of a system that may be utilized for providing access to the captured information and integrated information generated by the control system 210 of FIG. 8. Often different individuals in different companies involved in a complex process, such as the drilling process, need information to make certain decisions. For example, specialists with an operator and a service company may need information captured and integrated as described in reference to FIG. 8 to make decisions relating to an aspect of the current drilling operation or for quality control purposes or to make decisions relating to another drilling operation or for forensic analysis in case of a failure or an anomaly. However, some such information may be confidential to a competitor of the service company, but not to the operator. For a variety of reasons, access to information is controlled by the entitlement manager 270. In one aspect, the control system 210 of FIG. 10 may be configured to control access to the captured and integrated information based on the rules provided to the entitlement manager 270. The control system 210 is configured to receive requests for information from various individuals, such as operator witness 410, operator partner witness 420, service company witness 430, and contractor witness 440. The control system using the rules of access disseminates the authorized information to the requestors. The requestors may then collaborate with each other based on their own rules of governance 450 and/or those mandated by a governing body. Any decisions made by the collaborating parties may be fed back to the control system 210 via link 452 for storage and/or integration and to the platform 110 (FIG. 7) for personnel action.

In another aspect, the system 210 may also be configured such that a legitimate recipient of information may perform a variety of functions on the received information. For example, the recipient may view the information in a still mode or in a continuous mode when the information is stored in a video mode. In another aspect, the recipient may pause, fast forward the information, go back to a previously viewed segment of the information and edit the information. The edits may include time stamps and the identity of the recipient. Any such information sent back to the system 210 may be stored and integrated with other information in the manner described in reference to FIGS. 8 and 9.

Thus, in aspects, the systems and methods disclosed herein can provide targeted traceability of the information about any and every step in a process chain. In one aspect, the term traceability may be referred to as a substantial completeness of the information about one or more steps in a process. In another aspect, traceability may be defined as an unambiguous and substantially complete record of decisions and assumptions implemented and of the modes and data used in arriving at a given set of results for a process. In another aspect, the systems and methods provide a chain of custody of the information. The chain of custody provides an indication of the ownership of the information from the origination through a time period and may indicate any links of broken custody. In other aspects, the systems and methods herein provide the ability to track (identify and measure) all stages leading to a particular point in a process that consists of a chain of interrelated events. In another aspect, the systems and methods provide mechanisms to relate the captured and integrated information to selected references and standards (such as local standards set by an operator and national or international standards set by the industry or a governing body) through an unbroken chain of comparisons. The systems and methods also provide identification of the origin of captured information and personnel creating or interacting with the captured information.

Once in place, the operation and communication system 10 can support various collaborative uses to improve efficiency, quality, safety and performance, including but not limited to, trouble-shooting, such as when the oilfield personnel (onsite actor 36) has a technical problem and needs expert help, the onsite actor 36 would initiate a session with the relevant SME 40 to walk him or her through a fix. Also, tele-maintenance can be accomplished using the operation and communication system 10. During routine maintenance activities, the SME 40 can provide on-demand guidance and technical insights related to routine and non-routine findings and issues on demand. Job advisory and witnessing is further enabled by the operation and communication system 10. During the actual service or job, the SME 40 can provide virtual over the shoulder guidance, process assurance and operations conformance while monitoring for safe working conditions. Separately, this will allow relevant stakeholders to remotely witness critical points of the job operations in conjunction with conventionally recorded data (pressure, rate, etc). Advantageously, the operation and communication system 10 may further provide process safety assurance ensuring operational task are conducted to conformance requirements. Visual or operational process safety triggers will automatically prompt SME 40 to validate and verify appropriate barrier workflow is deployed as per job plan, management of change or prescribed practices. The system 10 has the ability to tie into alert/alarm/threat detection software/tools that can automatically drive a certain workflow/procedure to be displayed as well as the relevant video/audio channels to open. This triggering of the surveillance and the workflow will allow the remote SME to efficiently handle the respective situation, not exclusive to process safety incidents, but any of the use cases described herein.

As further examples, on critical cementing jobs located in remote parts of the world, the cementer (e.g., onsite actor 36) will be able interact with the relevant engineering or operations SME 40 to trouble shoot technical or engineering related issues with the cementing unit 24, including operations function (valve, actuator, mixer, hydraulics, electronics, etc), maintenance (repair or replace), testing post repair work, receive on-demand guidance regarding pre-job maintenance anomalies, access the experience of veteran cementing experts (e.g. offsite actor 40) when unexpected workflow situations arise over the course of the job.

A real-time approach to these activities will significantly improve existing operational practices by reducing non-productive time related to contacting experts 40 using non-dedicated rig/field side communication channel, eliminating or at least reducing language or communication delays/barriers by taking advantage of targeted visual verification and validation with the video feeds, allowing organizations to baseline and record job and maintenance process performance and driving continuous improvement, creating a traceable record of operational activities to support legal, compliance, and stakeholder documentation or recordkeeping requirements. Furthermore, relevant recorded information can be used for training and training manuals.

To fully appreciate the operation and communication system 10 at an oilfield site 16, an organized deployment methodology should be followed that would include a clear set of business requirements and intended outcomes, understanding and documenting existing technical capabilities, gaps, and restrictions of the oilfield site 16 and the corresponding subject matter expert locale 22, and change management process support, and especially with process(es) considered to be critical, developing a situation specific technical architecture that clearly documents the flow of data.

The operation and communication system 10 would require deployment and realization of technical architecture. That is, before operational realization, necessary legal and information technology approvals should be obtained to ensure the un-inhibited flow of information and data. Also, appropriate oilfield side information technology devices including but not limited to servers, switches, routers, Wi-Fi routers etc. need to be put into place, as well as appropriate multi-media data sources including but not limited to zone rated (if applicable) fixed video cameras 26, hand-held cameras 12, two way radio's 32, wearable video/radio devices, and mobile computing devices. The personal computer may be stationary desktop, laptop or tablet. The system 10 may include all of the multi-media data sources, usable as modular devices, such that the appropriate combination is selected from the set of multi-media data sources for a particular operation. Additionally, necessary bandwidth, data transmission protocol, firewall exceptions and approvals and receiving data center capacity should be in place. Training and orientation for field and support SME personnel 36, 38, 40 would further optimize the operation and communication system 10, as would records ownership and retentions plan.

Once the operation and communication system 10 is in place for a particular oilfield site 16, the system 10 would be scalable to encompass the needs of multiple and varying oilfield related requirements associated with field development (remote sensing), well construction (drilling fluids management, bottom hole assembly ("BHA") management/maintenance for logging while drilling ("LWD")/measurements while drilling ("MWD"), blow-out preventer ("BOP") testing, cementing equipment operations support and maintenance (casing, plug placement, tool servicing), logging operations support, completion systems (upper and lower) assembly and operations support, stimulation support, pipeline processing pre-commissioning, servicing support production and facilities maintenance support, field and well decommissioning/abandonment support, remote operated vehicle ("ROV") maintenance and services support.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. An operation, communication, and executions facilitation system comprising:
   at least one modular system device including at least one onsite fixed-base camera configurable at an onsite location directed at job equipment for remote live operation viewing by at least one offsite actor, at least one onsite hand-held camera directable by at least one onsite actor at selected equipment for remote live viewing of custom images by the at least one offsite actor, at least one audio communication device usable by the at least one onsite actor, and at least one personal computer configurable to receive data from onsite equipment;
   a secured or dedicated network connected to one or more of the at least one modular system device;
   a data center in communication with the secured or dedicated network;
   at least one operations center at an offsite location configured to be manned by the at least one offsite actor and configured to receive data via the data center from the at least one modular system device; and,
   an onsite secured satellite communications system configured to send data from the network to a satellite hub station via satellite Internet, the data center in communication with the satellite hub station;
   wherein two-way communication between the at least one offsite actor and the at least one onsite actor is accomplished through one or more of the at least one onsite hand-held camera, the at least one audio communication device, and the at least one personal computer.

2. The system of claim 1, further comprising a firewall between the onsite satellite communications system and the network.

3. An operation, communication, and executions facilitation system comprising:
  at least one modular system device including at least one onsite fixed-base camera configurable at an onsite location directed at job equipment for remote live operation viewing by at least one offsite actor, at least one onsite hand-held camera directable by at least one onsite actor at selected equipment for remote live viewing of custom images by the at least one offsite actor, at least one audio communication device usable by the at least one onsite actor, and at least one personal computer configurable to receive data from onsite equipment;
  a secured or dedicated network connected to one or more of the at least one modular system device;
  a data center in communication with the secured or dedicated network;
  at least one operations center at an offsite location configured to be manned by the at least one offsite actor and configured to receive data via the data center from the at least one modular system device; and,
  a processor connected to the network and data center and configured to:
    obtain a first set of information in a first form that includes a plurality of images from the at least one fixed base camera and the at least one hand-held camera generated over a selected time period as a result of monitoring targeted well process;
    obtain a second set of information in a second form that includes a decision made in running one or more targeted well processes that generates the first set of information in the first form;
    time synchronize the first set of information in the first form and the second set of information in the second form;
    integrate the time-synchronized first set of information in the first form and second set of information in the second form; and
    provide the integrated data to the at least one offsite actor based on an authorization of the at least one offsite actor to allow the at least one offsite actor to analyze the decision made in running the one or more well processes;
  wherein two-way communication between the at least one offsite actor and the at least one onsite actor is accomplished through one or more of the at least one onsite hand-held camera, the at least one audio communication device, and the at least one personal computer.

4. The system of claim 3, wherein the first set of information is stamped with an identity of the at least one onsite actor involved in generating the first set of information and a time.

5. The system of claim 3 wherein the first set of information further includes audio from the at least one audio communication device.

6. The system of claim 1 further comprising a plurality of sensors configured to sense a plurality of parameters of the operation, wherein data from the plurality of sensors is receivable by the at least one personal computer.

7. The system of claim 6 further comprising at least one visualization station at the at least one operations center, the at least one visualization station including a visualization screen displaying data from the at least one modular device and the plurality of sensors.

8. The system of claim 7, wherein the visualization station further includes an adaptive response workflow screen and a map visualization screen.

9. The system of claim 7, wherein the visualization station further includes workflow and multi-media recording and reporting.

10. The system of claim 1, wherein the at least one audio communication device is at least one handheld push-to-talk radio handset.

11. A method of providing and facilitating real-time equipment maintenance, trouble-shooting, and targeted remote operational process assurance of an operation, the method comprising:
  selecting one or more modular system devices from a group including at least one onsite fixed base camera configurable at an onsite location to be directed at operation equipment for remote live operation-viewing by at least one offsite actor, at least one onsite hand-held camera directable by at least one onsite actor at selected equipment for remote live viewing of custom images by the at least one offsite actor, at least one audio communication device to be manned by the at least one onsite actor, and at least one personal computer configurable to receive data from onsite equipment;
  connecting the one or more modular system devices to a network;
  providing an onsite satellite communications system configured to send data from the network to a secured satellite hub station via satellite Internet;
  configuring a data center to be in communication with the secured network, the data center in communication with the satellite hub station; and,
  manning an operations center at an offsite location with the at least one offsite actor, the operations center configured to receive, record, playback, transfer, and analyze data via the data center from the one or more modular system devices;
  wherein two-way communication between the at least one offsite actor and the at least one onsite actor is accomplished through one or more of the at least one onsite hand-held camera, the at least one audio communication device, and the at least one personal computer.

12. The method of claim 11, further comprising configuring a plurality of sensors to sense a plurality of parameters of the operation, and sending data from the plurality of sensors to the at least one personal computer.

13. The method of claim 11, further comprising placing a firewall between the onsite satellite communications system and the network.

14. A method of providing and facilitating real-time equipment maintenance, trouble-shooting, and targeted remote operational process assurance of an operation, the method comprising:
  selecting one or more modular system devices from a group including at least one onsite fixed base camera configurable at an onsite location to be directed at operation equipment for remote live operation-viewing by at least one offsite actor, at least one onsite hand-held camera directable by at least one onsite actor at selected equipment for remote live viewing of custom images by the at least one offsite actor, at least one audio communication device to be manned by the at least one onsite actor, and at least one personal computer configurable to receive data from onsite equipment;

connecting the one or more modular system devices to a network;

configuring a data center to be in communication with the secured network; and, manning an operations center at an offsite location with the at least one offsite actor, the operations center configured to receive, record, playback, transfer, and analyze data via the data center from the one or more modular system devices; and, connecting a processor to the secured network and data center and configuring the processor to:

obtain a first set of information in a first form that includes a plurality of images from the at least one fixed base camera and the at least one hand-held camera generated over a selected time period as a result of a well process;

obtain a second set of information in a second form that includes a decision made in running the well process that generates the first set of information in the first form;

time synchronize the first set of information in the first form and the second set of information in the second form;

integrate the time-synchronized first set of information in the first form and second set of information in the second form; and provide the integrated data to the at least one offsite actor based on an authorization of the at least one offsite actor to allow the at least one offsite actor to analyze the decision made in running the well process;

wherein two-way communication between the at least one offsite actor and the at least one onsite actor is accomplished through one or more of the at least one onsite hand-held camera, the at least one audio communication device, and the at least one personal computer.

15. The method of claim 14, wherein the first set of information is stamped with an identity of the at least one onsite actor involved in generating the first set of information and a time.

16. The method of claim 14 wherein the first set of information further includes audio from the at least one audio communication device.

17. The method of claim 11 further comprising supporting data capture with time-stamp of targeted wellsite operations.

18. The method of claim 11 further comprising facilitating remote real-time access to the at least one offsite actor for interaction with the at least one onsite actor regarding targeted wellsite operations related to compliance, safety, asset and personnel security or regulatory guidelines.

19. The method of claim 11 further comprising facilitating real-time equipment operations, maintenance supervision and trouble-shooting from remote locations by the at least one offsite actor.

20. The method of claim 11 further comprising facilitating simultaneous real-time audio and video documentation of executed operations.

21. The method of claim 11 further comprising facilitating remote real-time validation and verification, procedural and process assurance by the at least one offsite actor regarding operational, safety, and security related procedures, workflows and processes.

22. The system of claim 1, further comprising at least one of fiber, corporate network, and land based network as a communication protocol for the system.

23. The method of claim 11, further comprising at least one of fiber, corporate network, and land based network as a communication protocol for the system.

* * * * *